(12) United States Patent
Korsunsky

(10) Patent No.: US 6,313,610 B1
(45) Date of Patent: Nov. 6, 2001

(54) BATTERY PROTECTION CIRCUIT EMPLOYING ACTIVE REGULATION OF CHARGE AND DISCHARGE DEVICES

(75) Inventor: Roman Korsunsky, Apex, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/643,124

(22) Filed: Aug. 21, 2000

Related U.S. Application Data

(60) Provisional application No. 60/149,980, filed on Aug. 20, 1999.

(51) Int. Cl.[7] .............................. H01M 10/14; H02J 7/00; H02H 3/00
(52) U.S. Cl. .............................. 320/134; 361/82; 361/84; 361/93
(58) Field of Search .............................. 320/134; 361/82, 361/93, 84, 115

(56) References Cited

U.S. PATENT DOCUMENTS

| | | | |
|---|---|---|---|
| 5,304,915 | 4/1994 | Sanpei et al. | 320/14 |
| 5,652,501 | 7/1997 | McClure et al. | 320/17 |
| 5,705,911 | 1/1998 | Tamai | 320/5 |
| 5,789,900 | 8/1998 | Hasegawa et al. | 320/132 |
| 5,847,538 | 12/1998 | Yoshimatsu | 320/5 |
| 5,847,912 | 12/1998 | Smith et al. | 361/93 |
| 5,850,136 | 12/1998 | Kaneko | 320/119 |
| 5,856,738 | 1/1999 | Yoshimatsu | 320/136 |
| 5,867,008 | 2/1999 | Du et al. | 320/136 |
| 5,880,575 | 3/1999 | Itou et al. | 320/122 |
| 5,896,025 | 4/1999 | Yamaguchi et al. | 320/134 |
| 5,909,103 | 6/1999 | Williams | 320/134 |

*Primary Examiner*—Gregory J Toatley, Jr.
(74) *Attorney, Agent, or Firm*—Weingarten, Schurgin Gagnebin & Hayes LLP

(57) ABSTRACT

A battery protection circuit includes back-to-back connected metal-oxide-semiconductor field-effect transistors (MOSFETs). Detection circuitry detects whether the battery is in a normal charge condition, an overcharged condition, or an over-discharged condition, and for the overcharged and over-discharged conditions the circuitry asserts a corresponding enable signal. For each MOSFET, a corresponding gate voltage regulating circuit controls the gate voltage such that (i) when the corresponding enable signal is de-asserted, the gate voltage is sufficient to enable the MOSFET to strongly conduct current in either direction, and (ii) when the corresponding enable signal is asserted, the gate voltage is a function of the polarity of drain-to-source voltage of the MOSFET. For each MOSFET, the corresponding gate voltage regulating circuit prevents the MOSFET from conducting when the drain-to-source voltage has an undesired polarity, and allows the MOSFET to conduct when the drain-to-source voltage has a desired polarity. One MOSFET prevents the flow of charge current, and the other prevents the flow of discharge current. When either MOSFET is conducting, its drain-to-source voltage is prevented from achieving a value sufficient to forward bias a parasitic diode associated with the source and drain terminals of the MOSFET. Current of correct polarity flows through the source-to-drain channel of a MOSFET rather than through the parasitic diode during the overcharged and over-discharged conditions.

3 Claims, 3 Drawing Sheets

BATTERY PROTECTION CIRCUIT EMPLOYING ACTIVE REGULATION OF CHARGE AND DISCHARGE DEVICES

CROSS REFERENCE TO RELATED APPLICATIONS

This application claims priority under 35 U.S.C. §119(e) of provisional application no. 60/149,980 filed Aug. 20, 1999.

STATEMENT REGARDING FEDERALLY SPONSORED RESEARCH OR DEVELOPMENT

Not Applicable

BACKGROUND OF THE INVENTION

The present invention is related to the field of battery protection circuits.

It is common to incorporate protection circuitry in battery-based power supplies. Protection circuitry detects certain battery conditions, and in response the circuitry controls the charging and discharging of the battery to prevent unsafe operation or operation that can damage the battery. Certain types of batteries, such as lithium-ion batteries, require protection from conditions such as overheating, overcharging, and over-discharging to prevent potentially explosive failure.

Generally, battery protection circuits include detection circuitry that monitors battery voltage, current, or other operating parameters, and one or more controlled elements such as transistors that interrupt or otherwise control battery current when an unsafe condition is detected.

One protection circuit in common use today includes two metal-oxide-semiconductor field-effect transistors (MOSFETs) arranged in a back-to-back configuration in series between the battery and a connection point for the load and charger. The respective gate voltages of the MOSFET are controlled by signals from detection circuitry that detects overcharged and over-discharged conditions of the battery. When both transistors are conducting, either charge or discharge current can flow. When either transistor is off, current is prevented from flowing in one direction. A parasitic element associated with each transistor, which is referred to as a "body diode", allows current to flow in the other direction. As a result, when the battery is in an overcharged condition, for example, the body diode of the non-conducting transistor permits the flow of discharge current but prevents the flow of charge current. Similar operation obtains when the battery is in an over-discharged condition.

The above approach suffers from the problem of excessive power dissipation under both overcharged and over-discharged operating conditions. Because current is flowing through a forward-biased diode with a non-negligible voltage drop, the power dissipated in the transistor is considerable. For example, if the charge or discharge current is 1 ampere, dissipated power is on the order of 1 watt. For many applications, such wasteful operation is very undesirable.

BRIEF SUMMARY OF THE INVENTION

In accordance with the present invention, a battery protection circuit is disclosed that provides overcharge and over-discharge protection while substantially reducing power dissipation caused by the flow of recovery current to/from the battery.

The disclosed battery protection circuit includes a pair of back-to-back connected metal-oxide-semiconductor field-effect transistors (MOSFETs). Detection circuitry detects whether the battery is in a normal charge condition, an overcharged condition, or an over-discharged condition, and for the overcharged and over-discharged conditions the circuitry asserts a corresponding enable signal. For each MOSFET, a corresponding gate voltage regulating circuit controls the gate voltage such that (i) when the corresponding enable signal is de-asserted, the gate voltage is sufficient to enable the MOSFET to strongly conduct current in either direction, and (ii) when the corresponding enable signal is asserted, the gate voltage is a function of the magnitude and polarity of drain-to-source voltage of the MOSFET. For one MOSFET, the corresponding gate voltage regulating circuit prevents the MOSFET from conducting when the drain-to-source voltage has a charging polarity, and allows the MOSFET to conduct when the drain-to-source voltage has a discharging polarity. For the other MOSFET, the corresponding gate voltage regulating circuit prevents the MOSFET from conducting when the drain-to-source voltage has a discharging polarity, and allows the MOSFET to conduct when the drain-to-source voltage has a charging polarity. When either MOSFET is conducting, its drain-to-source voltage is prevented from achieving a value sufficient to forward bias a parasitic diode associated with the source and drain terminals of the MOSFET. As a result, current of correct polarity flows through the source-to-drain channel of a MOSFET during the overcharged and over-discharged conditions, rather than flowing through a MOSFET body diode, resulting in reduced power consumption in these operating states.

Other aspects, features, and advantages of the present invention are disclosed in the detailed description that follows.

DETAILED DESCRIPTION OF THE INVENTION

The disclosure of provisional application no. 60/149,980 filed Aug. 20, 1999 is incorporated herein by reference.

Figure 1:
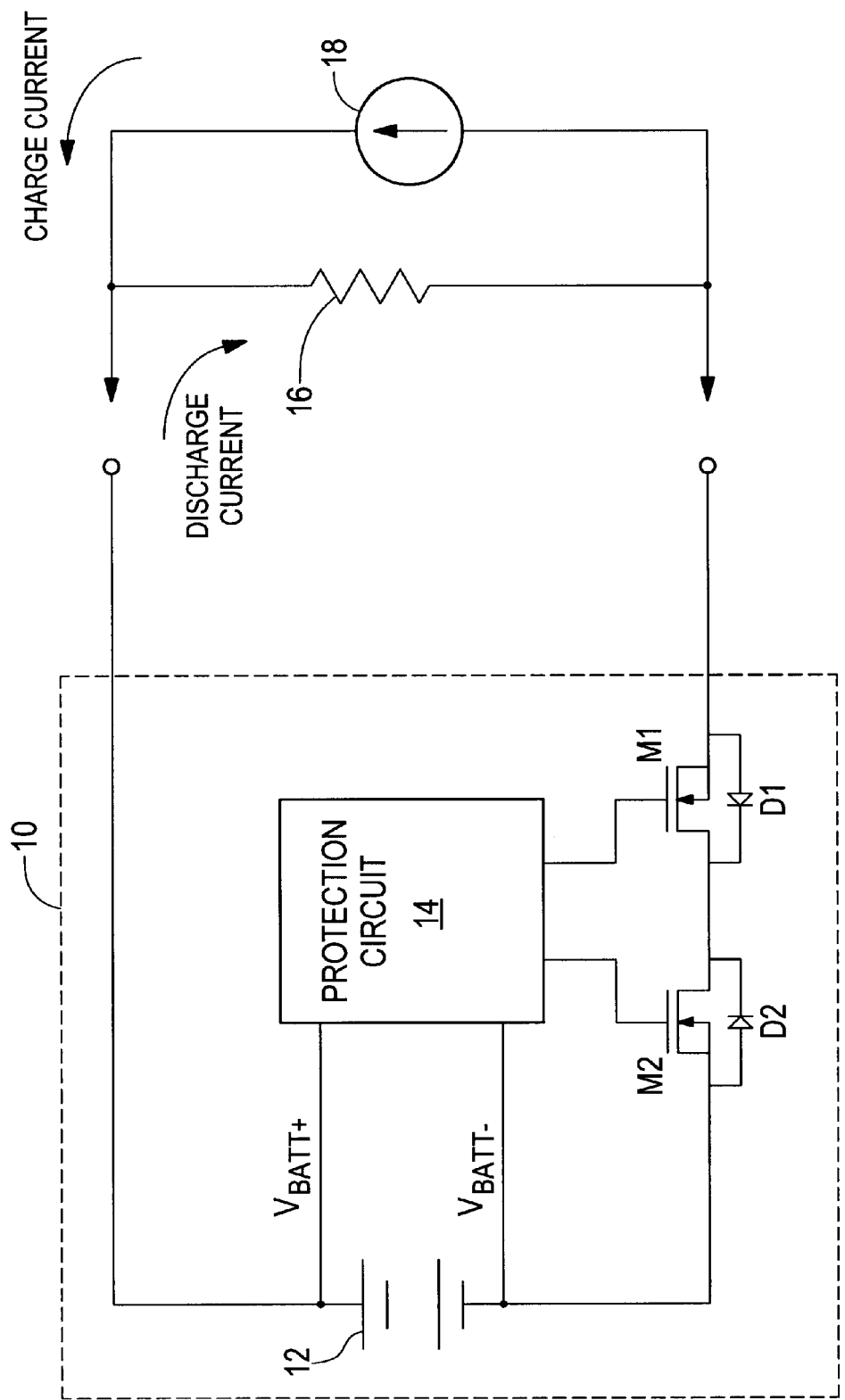
FIG. 1 is a schematic diagram of a battery-based power supply arrangement having battery protection circuitry as known in the prior art.

In FIG. 1, a battery pack 10 of the type used in many portable electronic devices is shown to include a lithium-ion battery 12, a pair of metal-oxide-semiconductor (MOS) transistors M1 and M2, and a protection circuit 14. Strictly speaking, the transistors M1 and M2 form part of the battery protection circuitry, but for ease of description the label "protection circuit" is given to those components apart from the transistors M1 and M2 that implement the protection function.

The transistors M1 and M2 are shown in conjunction with corresponding parasitic diodes D1 and D2, which are also referred to herein as "body" diodes. A body diode inherently exists in the multi-layered silicon structure of a typical MOS transistor. As described below, these parasitic diodes D1 and D2 actually contribute to the normal operation of the protection circuitry.

Also shown in FIG. 1 are a resistor 16 and a current source 18 respectively representing the load and the charger, with arrows indicating the direction of charge current and discharge current.

The protection circuit 14 monitors the voltage across the battery 12 via connections labeled $V_{BATT+}$ and $V_{BATT-}$ as shown, and controls the voltages applied to the gates of the transistors M1 and M2 to control the flow of current into and out of the battery pack 10. In particular, the protection circuit 14 detects from the battery voltage whether the battery 12 is in a normal charge condition, an over-charged condition, or an over-discharged condition, and controls the conduction of the transistors M1 and M2 accordingly. More specifically, the protection circuit 14 implements the following truth table:

| Condition | M1 | M2 |
| --- | --- | --- |
| Normal | Conducting | Conducting |
| Over-charged | Not conducting | Conducting |
| Over-discharged | Conducting | Not Conducting |

Thus, under normal conditions, both of the transistors M1 and M2 are conducting, so that the path for charge current as well as for discharge current runs through both devices. The body diodes D1 and D2 are prevented from conducting, because the small voltage drop across each transistor M1 and M2 is insufficient to forward bias the corresponding diode D1 or D2.

When the battery 12 is in an over-charged condition, transistor M2 continues to conduct, but transistor M1 is shut off. The only path for current is around transistor M1 through body diode D1. Accordingly, only discharge current (flowing in a clockwise direction in FIG. 1) can flow. Even if the voltage across the battery pack terminals rises to the point that charging current would normally be induced, the body diode D1 prevents such current from flowing.

It will be appreciated that operation for the over-discharged state is analogous to operation in the over-charged state. When the battery 12 is in the over-discharged state, transistor M2 is shut off, and diode D1 permits the flow of charge current and prevents the flow of discharge current.

One drawback of the scheme depicted in FIG. 1 is the use of diodes D1 and D2 in the charge or discharge path when the battery 12 is in either an over-charged or over-discharged state. Depending on the magnitude of the charge or discharge current, there may be significant power loss in the active diode. For example, a 1 ampere current can result in a power dissipation on the order of 1 watt in a typical forward-biased diode. The over-charged and over-discharged states do not usually occur very frequently, but a protection circuit must nevertheless be capable of handling such conditions without experiencing failure or damage. The cost and/or size of the circuit may be increased significantly simply to handle these uncommon conditions.

Figure 2:
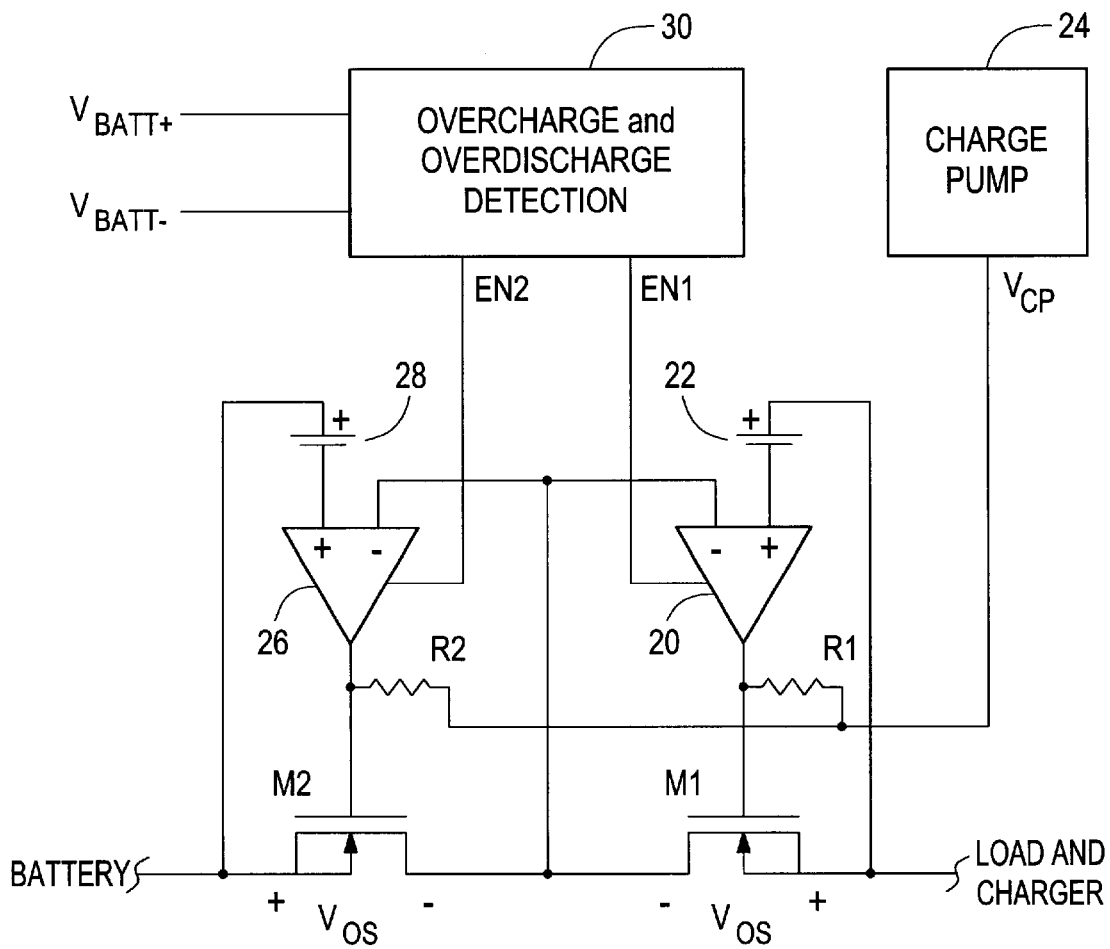
FIG. 2 is a schematic diagram of battery protection circuit capable of use in an arrangement like that of FIG. 1 according to the present invention.

FIG. 2 shows protection circuitry that addresses this problem of excessive power consumption when a battery is in either an over-charged or over-discharged state. Like the circuit of FIG. 1, this circuitry employs two series-connected transistors, which are again labeled M1 and M2. The body diodes are not shown in FIG. 2, because as described below they are not relied upon to carry current when the battery is in an over-charged or over-discharged condition.

Associated with the transistor M1 is a circuit including an operational amplifier 20 having an input offset voltage $V_{OS}$ represented by a voltage source 22. The magnitude of the voltage $V_{OS}$ may be on the order of 50 mV or other values as will be clear to those skilled in the art based on the description herein. The inputs to the amplifier 20 are connected to the source and drain of the transistor M1, and the output of the amplifier 20 is connected to the gate of the transistor M1. A resistor R1 serves as a pullup resistor between the gate of the transistor M1 and a high positive voltage $V_{CP}$ generated by a charge pump 24. A similar circuit consisting of an operational amplifier 26, an offset voltage source 28, and a resistor R2 is similarly connected to transistor M2. Resistors R1 and R2 have high resistance values, such as 10 MΩ for example. The amplifiers 22 and 26 receive respective enable signals EN1 and EN2 from overcharge and over-discharge detection circuitry 30.

In operation, the overcharge and over-discharge detection circuitry 30 detects whether the battery 12 is in a normal condition, an overcharged condition or an over-discharged condition, and generates the signals EN1 and EN2 in accordance with the following truth table:

| Condition | EN1 | EN2 |
| --- | --- | --- |
| Normal | De-asserted | De-asserted |
| Over-charged | Asserted | De-asserted |
| Over-discharged | De-asserted | Asserted |

When either signal EN1 or EN2 is de-asserted, the corresponding amplifier 20 or 26 is prevented from providing drive to the gate of the corresponding transistor M1 or M2. In such a case, the gate is pulled up to the voltage $V_{CP}$ by the action of the corresponding resistor R1 or R2, turning the corresponding transistor M1 or M2 on. Therefore, under normal operating conditions, both transistors M1 and M2 are conducting, and allow either charge or discharge current to flow.

When either enable signal EN1 or EN2 is asserted, the corresponding amplifier 20 or 26 provides drive to the gate of the corresponding transistor M1 or M2 at a sufficiently strong level to overcome the pullup effect of resistor R1 or R2. For ease of description, the operation of the amplifier 20 and associated circuitry is described below. It will be appreciated that the amplifier 26 and associated circuitry operate in an analogous manner.

The amplifier 20 detects the drain-to-source voltage $V_{DS1}$ of the transistor M1. When this value is sufficiently negative, the amplifier drives the gate voltage of transistor M1 to a high level. Although it is not shown in FIG. 2, the output stage of the amplifier 20 receives DC power from the charge pump 24 as well, so the gate voltage can be driven to a sufficiently high value to fully turn on the transistor M1. Under these conditions, the transistor M1 conducts discharge current. It will be noted that the voltage $V_{DS1}$ is prevented from reaching a value lower than $-V_{OS}$ under these conditions, and therefore the body diode (not shown) does not become forward-biased. This situation is shown in FIG. 2 by the appearance of the voltage $V_{OS}$ across the source and drain terminals of the transistor M1.

When the voltage $V_{DS1}$ is positive, the amplifier 20 drives the gate voltage of the transistor M1 to a low level, turning the transistor off. These conditions occur when charge current is attempting to flow in the circuit. The circuitry quickly detects this condition, and responds by shutting off the transistor M1 to prevent any significant discharge current from flowing through the normal conductive channel of the device. Also, the body diode (not shown) is reverse-biased under these conditions, and therefore it does not conduct appreciable current.

It will be appreciated that the circuitry consisting of amplifier 26, offset voltage source 28, resistor R2 and transistor M2 operate in an analogous fashion. This circuitry permits the flow of charge current when the drain-to-source voltage $V_{DS2}$ of the transistor M2 is sufficiently negative, and prevents the flow of discharge current when the voltage $V_{DS2}$ of the transistor M2 is positive.

Figure 3:
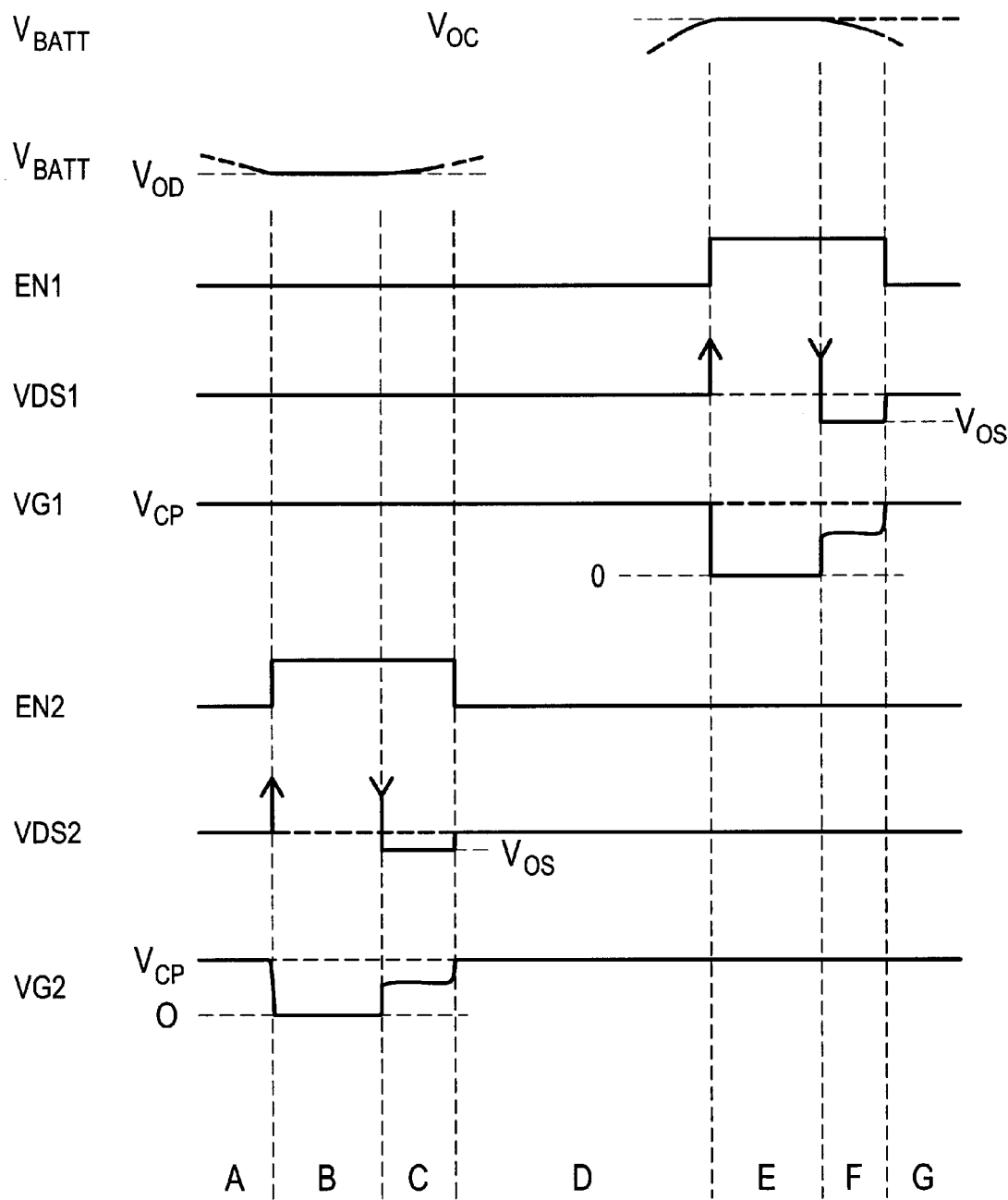
FIG. 3 is a waveform diagram depicting several signals as they appear during the operation of the circuit of FIG. 2.

FIG. 3 illustrates the operation of the circuit of FIG. 2. 7 distinct time intervals are shown in FIG. 2. In each interval, the battery voltage and charge/discharge activity are as follows:

A—Normal, discharging
B—Over-discharged, attempting to discharge
C—Over-discharged, charging
D—Normal, charging
E—Over-charged, attempting to charge
F—Over-charged, discharging
G—Normal, discharging During intervals A, D, and G, both of the enable signals EN1 and EN2 are de-asserted, and therefore the gate voltages VG1 and VG2 of the transistors M1 and M2 are both pulled to $V_{CP}$ by the charge pump 24 and the respective resistor R1 or R2. Both of the transistors M1 and M2 are conducting. Their respective drain-to-source voltages VDS1 and VDS2 are about zero volts, greater than $-V_{OS}$.

In interval B, the battery voltage has reached the over-discharge threshold $V_{OD}$. The enable signal EN2 becomes asserted. Because the voltage VDS2 is greater than $-V_{OS}$, the amplifier 26 pulls the gate voltage VG2 to zero volts, turning transistor M2 off. As a result, the voltage VDS2 goes to its most positive value, as indicated by the upward-pointing arrow on the VDS2 waveform. As long as the external circuitry is attempting to discharge the battery, the protection circuitry maintains these conditions.

In interval C, an external charger starts to drive the circuit, bringing VDS2 to a negative value. As soon as VDS2 reaches the voltage $-V_{OS}$, the amplifier 26 allows VG2 to rise to a value that turns on the transistor M2, preventing VDS2 from falling to any lower value. This intermediate voltage is shown as a step in the VDS2 waveform. Charge current flows until the battery voltage rises above $V_{OD}$ sufficiently to cause the de-assertion of EN2 by the detection circuitry 30.

Operation during intervals E and F is analogous to operation in intervals B and C as described above. EN1 is asserted when the battery voltage reaches $V_{OC}$, enabling the amplifier 20 to drive VG1 to zero volts and turn transistor M1 off. When the load begins discharging the battery, VDS1 is pulled down to $-V_{OS}$. The amplifier 20 allows VG1 to take on an intermediate value sufficient to turn on the transistor M1, enabling discharge current to flow. Once the battery voltage falls sufficiently below $V_{OC}$, the signal EN1 is de-asserted, and VG1 is driven to $V_{CP}$ by the action of the charge pump 24 and resistor R1.

A battery protection circuit with active regulation of charge and discharge devices has been shown. While the disclosed circuit employs n-channel MOSFETs, it will be appreciated by those skilled in the art that a similar protection circuit employing p-channel MOSFETs can be made, and that the circuit can be modified to work with a negative battery voltage instead of a positive one. It will be apparent to those skilled in the art that other modifications to and variations of the disclosed circuitry are possible without departing from the inventive concepts disclosed herein, and therefore the invention should not be viewed as limited except to the full scope and spirit of the appended claims.

What is claimed is:

1. A battery protection circuit, comprising:

a pair of back-to-back connected metal-oxide-semiconductor field-effect transistors (MOSFETs) M1 and M2;

a first gate voltage regulating circuit operative in response to a first enable signal EN1 to control the gate voltage VG1 of M1 such that (i) when EN1 is de-asserted, VG1 is sufficient to enable M1 to strongly conduct current in either direction, (ii) when EN1 is asserted, VG1 is a function of the polarity of drain-to-source voltage VDS1 of M1 so as to prevent M1 from conducting when VDS1 has a charging polarity and to allow M1 to conduct when VDS1 has a discharging polarity, the conducting of M1 preventing VDS1 from achieving a value sufficient to forward bias a parasitic diode associated with the source and drain terminals of M1;

a second gate voltage regulating circuit operative in response to a second enable signal EN2 to control the gate voltage VG2 of M2 such that (i) when EN2 is de-asserted, VG2 is sufficient to enable M2 to strongly conduct current in either direction, (ii) when EN2 is asserted, VG2 is a function of the polarity of the drain-to-source voltage VDS2 of M2 so as to prevent M2 from conducting when VDS2 has a discharging polarity and to allow M2 to conduct when VDS2 has a charging polarity, the conducting of M2 preventing VDS2 from achieving a value sufficient to forward bias a parasitic diode associated with the source and drain terminals of M2; and detection circuitry operative to detect the charge condition of a battery connected to the protection circuit and to generate the signals EN1 and EN2 such that: (i) in a normal charge condition, both EN1 and EN2 are de-asserted, (ii) in an overcharged condition, EN1 is asserted and EN2 is de-asserted, and (iii) in an over-discharged condition, EN1 is de-asserted and EN2 asserted.

2. A battery protection circuit according to claim 1, wherein the first and second gate voltage regulating circuits each comprise:

a first resistor connected between the gate of the respective transistor and a voltage source; and an operational amplifier having an output connected to the gate of the respective transistor, a first input connected to the drain of the respective transistor, and a second input connected to the source of the respective transistor.

3. A battery protection circuit according to claim 1, wherein M1 and M2 are n-channel MOSFETs.

* * * * *